(12) United States Patent
Makrucki

(10) Patent No.: US 6,208,622 B1
(45) Date of Patent: Mar. 27, 2001

(54) TRAFFIC FLOW CUTOVER TO VIRTUAL CONNECTION TRANSPORT

(75) Inventor: Brad Alan Makrucki, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/963,793

(22) Filed: Nov. 4, 1997

(51) Int. Cl.[7] ............................. H04L 1/00; H04L 12/28; G06F 9/45

(52) U.S. Cl. ................ 370/252; 370/235; 370/248; 370/351; 395/610; 395/617

(58) Field of Search .................... 370/252, 248, 370/230, 392, 232, 234, 235, 351, 231, 400; 395/200.15, 311, 617, 610, 600

(56) References Cited

U.S. PATENT DOCUMENTS

| 5,291,490 | * | 3/1994 | Conti et al. ............... 370/85.4 |
| 5,754,543 | * | 5/1998 | Seid ............................ 370/351 |
| 5,796,719 | * | 8/1998 | Peris et al. ................. 370/231 |
| 5,809,025 | * | 9/1998 | Timbs .......................... 370/400 |
| 5,949,757 | * | 9/1999 | Katoh et al. ............... 370/232 |

* cited by examiner

*Primary Examiner*—Huy D. Vu
*Assistant Examiner*—M. Phan
(74) *Attorney, Agent, or Firm*—Gerald R. Woods; Myers, Bigel, Sibley & Sajovec, P.A.

(57) ABSTRACT

Methods, apparatus and computer products are provided for allocating network resources for data transport between a source network node and a destination network node by selecting a transport mechanism from a plurality of transport mechanisms based upon a prediction of the cost of the utilization of the transport mechanism so as to provide the transport mechanism having the lowest predicted cost.

30 Claims, 9 Drawing Sheets

TRAFFIC FLOW CUTOVER TO VIRTUAL CONNECTION TRANSPORT

FIELD OF THE INVENTION

The present invention relates to networks and, more particularly, to transport of data between interconnected networks.

BACKGROUND OF THE INVENTION

As network communications grow more common, it becomes increasingly important to use network bandwidth in the most efficient way possible. In general, data communication through multiple networks is accomplished in one of two ways: routing each portion of the data through the network, called a routing system, or establishing a complete path through the network, called a connection. Each of these systems has its own advantages and disadvantages.

Routing System Transport

A routing system typically consists of tables of data that describe which computers are directly accessible to all other computers. The routing system examines a header within the packet to determine the destination address of a packet and which node in the network to transmit the packet to next, i.e. the destination of the next hop in the path from the source to the destination nodes. Ultimately, the data packet reaches the destination by being examined by each node in the path to the destination. The header within the packet contains an identifier that can be used to determine some of the characteristics of the packet. The resulting overhead in determining the paths on the routing system can reduce performance of data transport from the source to the destination. Consequently, a routing system works well if the data to be transported is relatively small or is concentrated at one point in time. One example of a routing system is transport control protocol/internet protocol ("TCP/IP"). TCP/IP does not utilize any specific predetermined path from a message source to a message destination. In TCP/IP, messages are routed based upon a destination address contained in the message. The message may take any path to the destination which is available. The message may also contain the address of the source of the message but typically does not contain the address of the devices in the path from the source to the destination. These addresses are determined by each device in the path based upon the destination address and the paths available.

FIG. 1 illustrates a typical interconnection of networks. As seen in FIG. 1, a source node 10 is connected to a destination node 35 by a number of networks, 12, 13, 14, 21, 22, and 31 and routing devices 15, 20, 25, and 30. When operating using TCP/IP, source node 10 sends a TCP/IP datagram to the destination node 35 by forwarding the datagram through a series of routing devices. Each subsequent routing device has information regarding networks and other routing devices that may be used to forward datagrams. The routing device 15 forwards the datagram based upon a destination address contained in the datagram by looking up in a routing table the address of the device where the datagram is to be sent. This routing table associates destination addresses with the addresses of accessible devices. Thus, in the present example, if the datagram from node 10 has a destination address specifying node 35, then routing device 15 may direct the datagram across network 13 to routing device 25, which in turn would route the datagram over network 22 to node 30, which would finally route the datagram to the destination node 35 over network 31. Each step in the path of the datagram from node 10 is referred to as a "hop". A routing table specifies the address of the next hop in a datagram's path based upon the destination address of the datagram. Thus, the routing table includes the address of accessible devices to the routing device and the destination addresses which are associated with those accessible devices.

The manner in which a routing table is utilized by a routing device is known as a "routing algorithm". In TCP/IP, the routing algorithm is typically a three step process where the first step is to determine from the destination IP address of the datagram whether the address appears among the direct routes (host devices or networks attach directly to the routing device) specified in the routing table. If such is the case, then the datagram is sent to the directly attached network. If the destination address does not specify a direct route, then the routing device determines if an indirect route (a route through a gateway to a device or network not directly connected to the routing device) is specified for the destination address. If such is the case, then the datagram is forwarded to the specified gateway IP address. Finally, if no direct or indirect route is specified, then the datagram may be sent to a default address or, if no default address is specified, an error message is returned to the source. The routing tables used by routing devices in TCP/IP networks may be arrived at in a number of ways. In one type of routing, a routing table is broadcast to each routing device from the device which maintains a routing table of all possible routes. In other forms of routing, each routing device builds a routing table via its own dialog which is called the routing protocol. These tables are then built and maintained by each routing device. In a third form of routing, a static routing table is used for each message routed.

Each of these cases may have its own disadvantages. For example, the broadcast and routing protocols are repeated on a routine basis to assure the routing device has an accurate routing table. Consequently, this broadcast may occupy network bandwidth. The static routing table, while not requiring network bandwidth, may be inefficient in determining the optimal routing path or, in a worse case, be unable to adapt to changes in the network topography which makes routes unavailable.

With respect to the dynamic routing methods, as the number of interconnected networks and number of devices connected to those networks increases, the size of the routing table and therefore the amount of network resources occupied to maintain the routing table may also increase. In certain circumstances, this overhead may occupy so much of the resources of the network as to cause unacceptable reductions in network performance. Thus, in a routing system, communications are individually routed which incurs overhead of routing each datagram at each network node. Routing may, therefore, be less than optimal for long communications between the same sources and destination nodes. There are, however, certain advantages to a routing system. Specifically, a routing system may have the advantages of reliability and bandwidth utilization. For example, a routing system may achieve increased reliability by its ability to route a message from a source node to a destination node along different or alternative paths. Furthermore, a routing system may achieve greater bandwidth utilization by using only that bandwidth which is necessary to transport the messages required.

Connection Oriented Transport

A connection oriented system consists of virtual connections that link source nodes to destination nodes. The virtual connections are configured early and exist until the data transmission is complete. Data is transported to a destination node by examining the header that indicates which virtual connection to use. Unlike a routing system, nodes in a connection oriented transport do not need to examine the packet to determine which node to route the data to next. Rather the complete connection is established in advance and maintained until the data transmission is complete. The connection oriented transport, however, allocates a discrete portion of the network's bandwidth for each virtual connection. If a virtual connection is not used properly, bandwidth may be wasted. A connection oriented transport works well if a large amount of data is to be transported.

One example of a connection oriented transport is asynchronous transport mode (ATM). ATM transports data by establishing virtual connections between the source and destination nodes. Unlike the routing systems described above, data transported by ATM has a channel allocated to its use. In other words, the datagram in a routing system only specifies its source and destination while a connection oriented system specifies the route the data follows across the network to reach the destination. Such a system is illustrated in FIG. 1. Source node 10 requests the connection to destination node 35 from network device 15. The connection request specifies several connection parameters, including destination, traffic type, bandwidth requirement, delay and cell loss requirement. Network device 15 determines which source to destination route best fits the parameters specified. Network device 15 then selects a virtual connection to the next network device and sends a connection setup request to that node. The network device receiving the request then selects its own virtual connection to the next network device and associates the virtual connection from network device 15 with the virtual connection it selected to the next network device. This process continues until the destination is reached and a complete virtual connection is established between the source and destination nodes. The destination node responds by returning an acknowledge (ACK) signal to the network device making the request. Each network device then returns the ACK to the network device that made a request to it. The ACK is ultimately transmitted back to the source node completing the connection setup.

For example, assume that network device 15 determines that the best connection to destination node 35 is across networks 13, 22, and 31. Network device 15 sends a connection request to network device 25 across network 13 using virtual connection 1. Network device 25 then selects virtual connection 2 across network 22 to network device 30. Network device 25 then associates the virtual connection between network devices 15 and 25 with the virtual connection between network device 25 and 30. In other words, network device 25 associates virtual connection 1 with virtual connection 2. Network device 25 then sends a connection setup request to network device 30. Network device 30 then selects virtual connection 3 to the destination node and associates it with the virtual connection 2. This completes the virtual connection in the forward direction.

The destination node then responds by sending an ACK to network device 30. Network device 30 sends an ACK with an identifier for virtual connection 3. Network device 25 then associates virtual connection 3 with virtual connection 2 going in the reverse direction. Network device 25 sends an ACK to network device 15 along with the identifier for virtual connection 2. Network device 15 then associates virtual connection 2 with virtual connection 1 going in the reverse direction. This completes the virtual connection from the destination to the source node. These connections in the established path are then utilized for data transmission without further reference to the individual packets. Thus in a connection oriented transport system communications are routed from the source node to the destination node without the overhead associated with a routing system. This has the advantage of relieving the individual nodes along the path specified from the source node to the destination node of the overhead of having to route each portion of the datagram. Thus the individual nodes along a routing path are relieved from the task of having to route messages from node to node.

There are, however, disadvantages associated with a connection oriented transport. Specifically, a complete connection using a connection oriented transport has a discrete amount of network bandwidth associated with it. Consequently, if a particular connection is not fully utilized, some network bandwidth is wasted. Furthermore, the overhead associated with establishing the virtual connection from the source node to the destination node may also cause network bandwidth to be wasted.

The best transport for the data should be chosen to make the most efficient use of the network resources. It is possible, however, for the nature of the data to change after the selection has been made. Consequently, the best transport choice can also change. For example, if a routing system was chosen originally and the nature of the data changes such that a connection transport would be more efficient, network resources would be wasted despite having made the proper choice at the outset. Consequently, it is desirable to switch from one transport mechanism to another (i.e., switch from a routing system to a connection oriented system if the switch would result in better use of network resources). One way to switch from one transport mechanism to another is to count the data packets transmitted and switch when the count exceeds some predetermined number. This method, however, is simplistic and does not directly address the problem in terms of the cost of network resources and may result in inefficient use of network resources. Given the important nature of network resources and the differences in performance between routing and connection oriented systems, there is a need for an improvement in how the most efficient type of transport is selected.

OBJECTS AND SUMMARY OF THE INVENTION

In light of the above discussion, it is an object of the present invention to provide more cost effective data transport over a network.

It is another object of the present invention to provide flexible control for the selection of the data transport.

These and other objects of the present invention are provided by allocating network resources for data transport between a source network node and a destination network node by selecting a transport mechanism from a plurality of transport mechanisms based upon a prediction of the cost of the utilization of the transport mechanism so as to provide the transport mechanism having the lowest predicted cost.

The cost may be predicted by totaling a cost associated with transporting data over a network from a source node to a destination node using the first data transport mechanism and adjusting the totaled cost associated with transporting data over a network from a source node to a destination node using the first data transport mechanism. Then the adjusted total is compared to the amount of data for which the cost of utilizing the second data transport to transport the data over the network is less than utilizing the first data transport to transport the data over the network.

Moreover, the parameters by which the signaling is controlled may be under the control of the user, thereby allowing the signal to be customized for many situations.

In one embodiment, the data transferred across the network is totaled. As the data transfer continues, the total is adjusted by draining an amount of the total as a function of the time that has elapsed.

In another embodiment, the rate at which totaled data is drained is a function of time. As the data transfer continues the drain rate, per unit of time, changes.

In still another embodiment, a prediction is made regarding the duration of the monitored data transfer. The prediction, called a planning horizon, is used to control the range over which the drain rate is controlled.

In yet another embodiment, the planning horizon is based upon historical performance data for similar data transfers.

In another embodiment, the planning horizon is based upon empirical data collected as the network operates.

As will be appreciated by those skilled in the art, the present invention may be embodied as a method, apparatus, or computer program product.

DETAILED DESCRIPTION OF PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable computer readable medium may be utilized including hard disks, CD-ROMs, optical storage devices, or magnetic storage devices.

Figure 1:
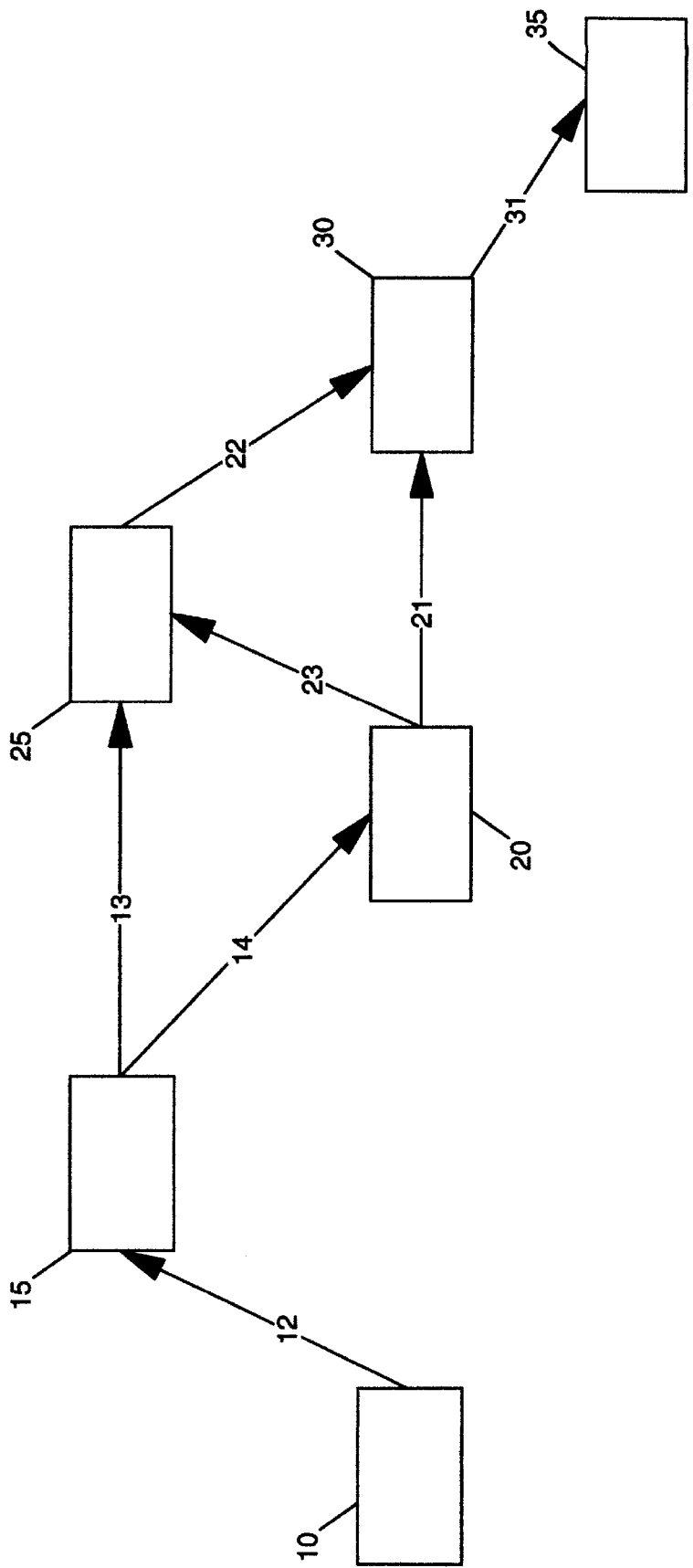
FIG. 1 is a block diagram of a network capable of transporting data using a routing system or a connection oriented system.
Figure 2:
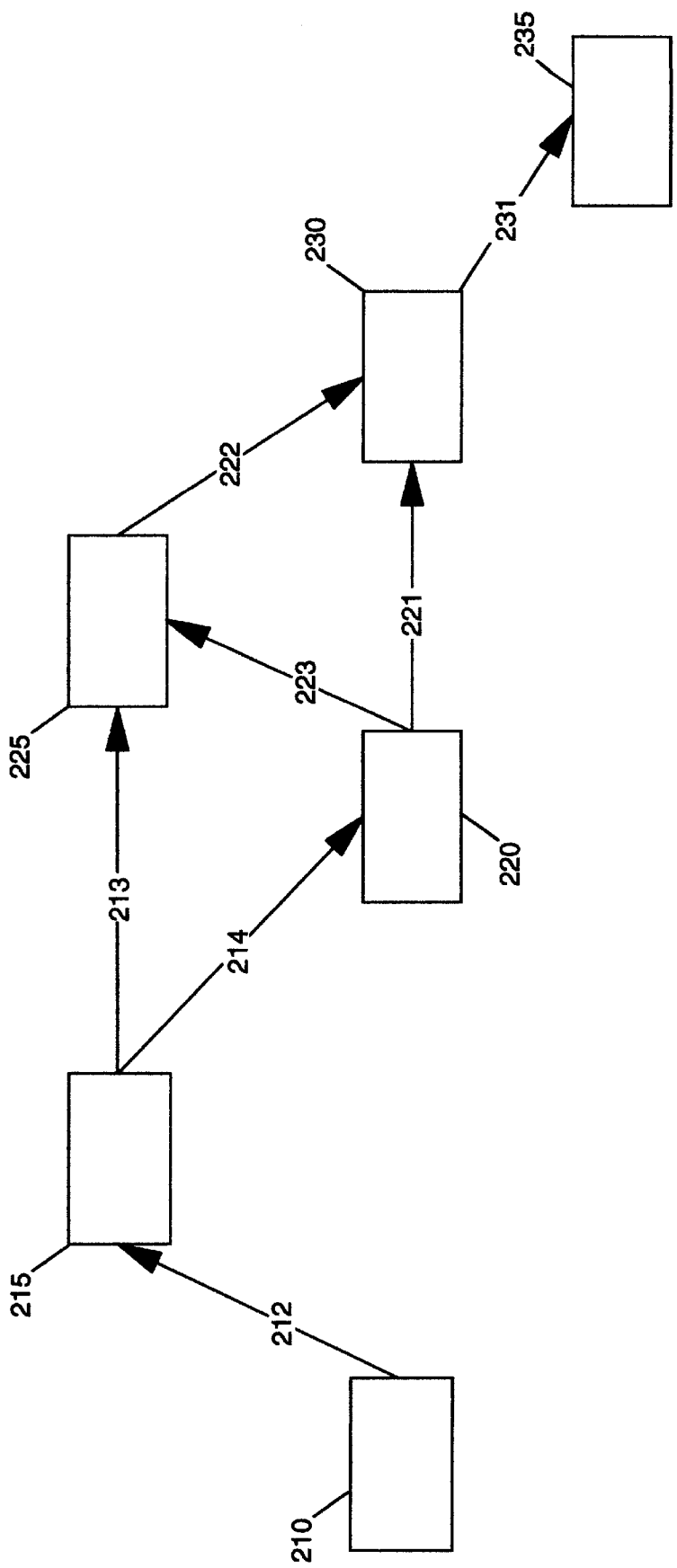
FIG. 2 is a block diagram, according to the present invention, of a network capable of transporting data using a routing system or a connection oriented system.

FIG. 2 illustrates a network over which data may be transported by a routing system or a connection oriented transport. For the purposes of the detailed description of the preferred embodiments, a TCP/IP system is described, those skilled in the art, however, will appreciate and understand that other routing systems are equivalent. For example, one skilled in the art would appreciate and understand that Integrated Services Digital Network (ISDN), File Transfer Protocol (FTP), Frame Relay, HTTP, or a standard packet switched network system would all be interchangeable with a TCP/IP system.

In the present embodiment of the invention data transport begins using a routing system mechanism. For example, data transport may occur between source node 210 and destination node 235 using a routing system mechanism. The routing system mechanism transports data from the source node 210 to the destination node 235 by routing data across network 212 to node 215. Node 215 then routes the data to across network 214 to node 225 or across network 213 to node 220. Node 225 may then route the data across network 222 to node 230. Alternatively, node 225 may route the data to node 220 across network 223. Similarly, node 220 may route the data across network 221 to node 230 or across network 223 to node 225. In other words, networks 222 and 221 may be bypassed. Finally, node 230 then routes the data to destination node 235 across network 231. The routing done by each node can place a burden on the routing system as a whole. The burden could be expressed as a cost of routing the data from the source node 210 to the destination node 235. It is therefore advantageous to monitor the routing cost so as to a recognize when a potentially more cost effective transport type may be used.

In general, the cost of each transport mechanism will depend on the nature of the data being transported. In particular, the total amount of data transported and its distribution over the lifetime of the data transport may be important factors in the total cost. Consequently, one type of data transport mechanism may be more cost effective for a particular type of data being transported.

The cost of using either a connection oriented transport mechanism or a routing system transport mechanism will involve a setup cost and a per unit cost where the per unit cost may be expressed in terms of dollars per unit of data transported. There may, however, be a difference in the magnitude of each of these costs with respect to the particular transport mechanism. In other words, the setup cost for a connection oriented transport mechanism will typically be different than the setup cost for a routing system transport mechanism. Similarly, the per unit cost of a connection oriented transport mechanism will typically be different than the per unit cost of a routing system transport mechanism. Specifically, the cost of using a connection oriented transport mechanism Cc can be expressed as:

$$C_c = S_c + P_c T$$

where $S_c$ represents the setup cost of the connection oriented transport mechanism and $P_c$ represents the per unit cost of the connection oriented transport system and T (Traffic) equals the data transported over the network from the source node 210 to the destination node 235. Similarly, the cost of a routing system transport $C_r$ can be expressed as:

$$C_r = S_r + P_r T$$

where $S_r$ is equal to the setup cost of the routing system transport, $P_r$ is equal to the per unit cost of the routing system transport and T (Traffic) is the amount of data transported from source node 210 to destination node 235. In general, these cost functions show that the cost of using a particular type of data transport mechanism is dependent on the amount of Traffic. Consequently, as the traffic changes so will the cost associated with both types of data transport. Furthermore, when the cost associated with each type data transport changes, it may be more cost effective to switch from one transport mechanism to the other. Using these two relationships, it is possible to determine the traffic T at which the cost of using a routing system transport mechanism exceeds the cost of a connection oriented transport mechanism:

$$T \geq (S_c - S_r)/(P_r - P_c)$$

As a general proposition, it is advantageous to cutover from the routing system transport mechanism to a connection oriented transport mechanism when the Traffic exceeds T.

The cutover from the routed system transport mechanism to the connection oriented transport mechanism should occur so that the cost associated with the data transport is less over the entire transfer than if the cutover had not occurred. For this reason, it is important that the cutover not occur too early or too late.

Figure 3A:
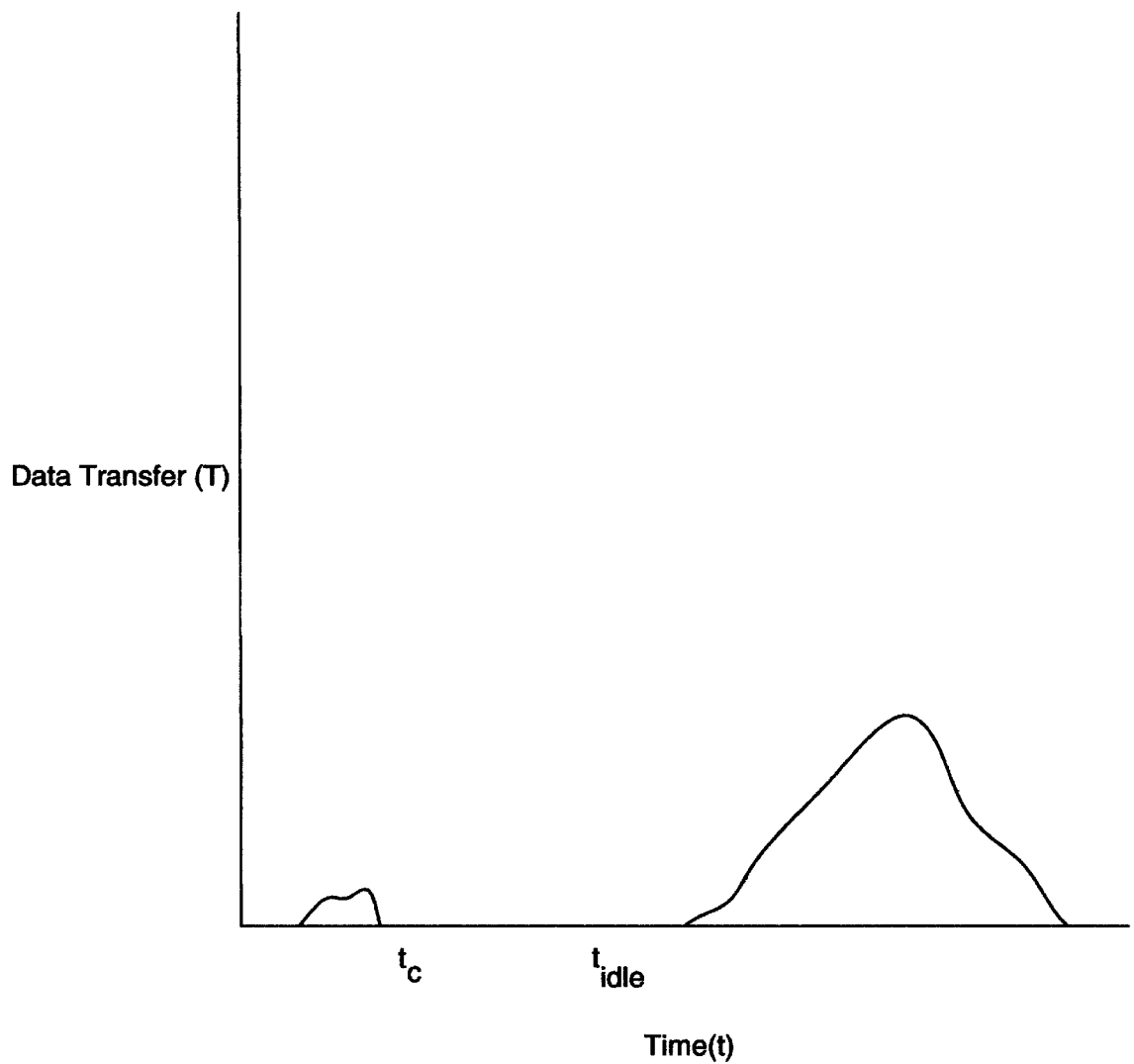
FIGS. 3A and 3B are graphs showing two possible distributions of data transfers across a network.
Figure 3B:
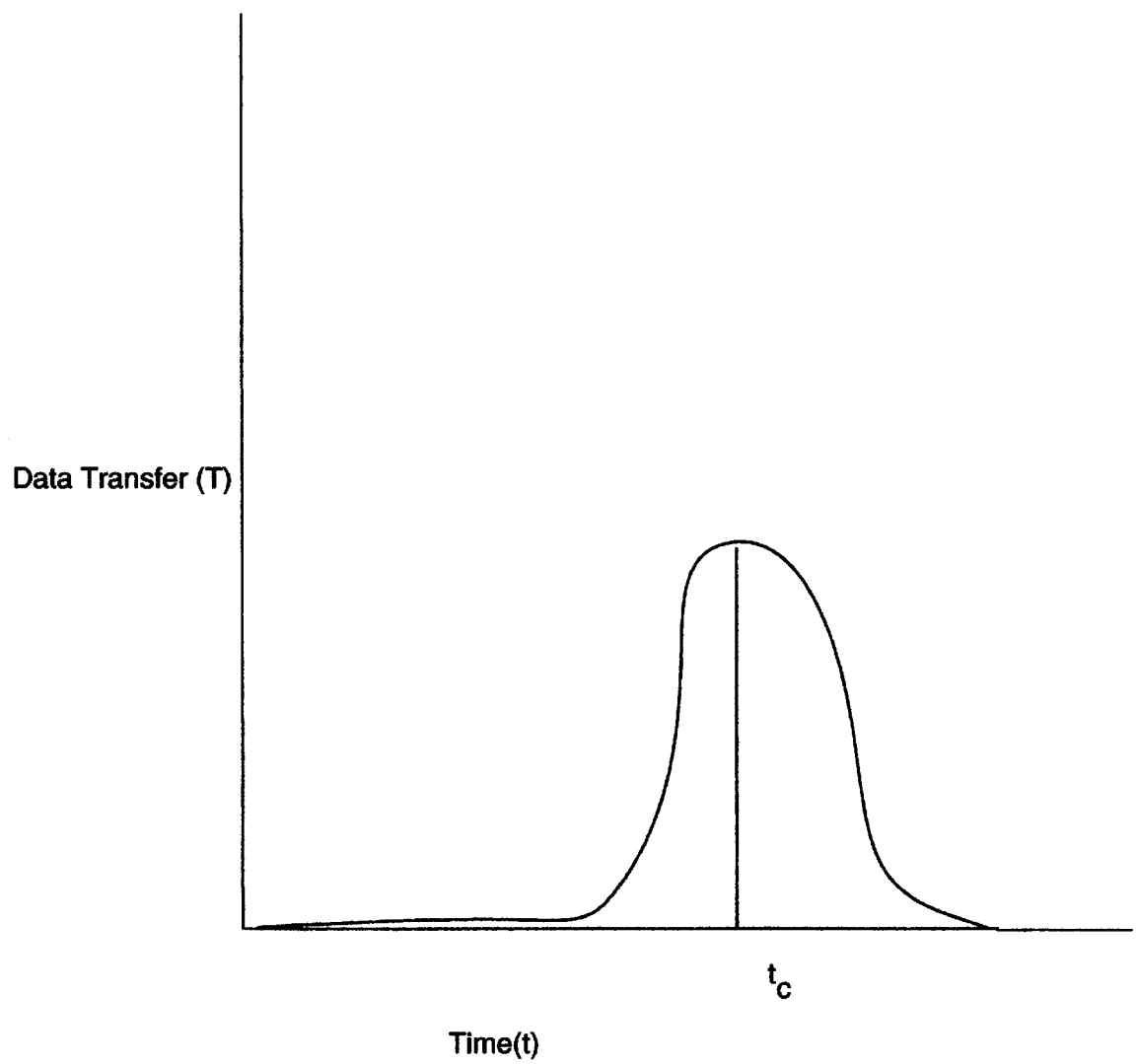

FIGS. 3A and 3B illustrate improper cutover in two scenarios. FIG. 3A illustrates how an early data transfer can cause a premature cutover. Initially, some data transport activity occurs for which a cutover from a routed system mechanism to a connection oriented transport mechanism would be premature. The cutover is premature because there is a long idle time, $t_{idle}$ during which no data is transferred. Consequently, a cutover to a connection oriented transport mechanism at $t_c$ would allocate network bandwidth to the connection despite there being very little data to transport. Later, however, sufficient traffic T begins to flow such that the cost associated with switching to a connection oriented transport mechanism is justified. Consequently, a cutover at the earlier time would have been more costly than if the routing system transport mechanism had been allowed to continue until the later time.

FIG. 3B illustrates how a late cutover can occur. Until a time $t_c$, insufficient traffic has been transferred across the network to justify a cutover. At a later time, however, more data is transferred. But, the data transfer occurs so late that not enough data remains to be transferred to justify a cutover. In other words, the time $t_c$ shown in FIG. 3B is too late to justify the cost associated with switching from a routed system to a connection oriented system.

FIGS. 3A and 3B illustrate that it may be important to accurately predict the costs associated with transporting data across the network and the point at which cutover should be signaled. Otherwise, a cutover could result in wasted bandwidth and cost.

Figure 4A:
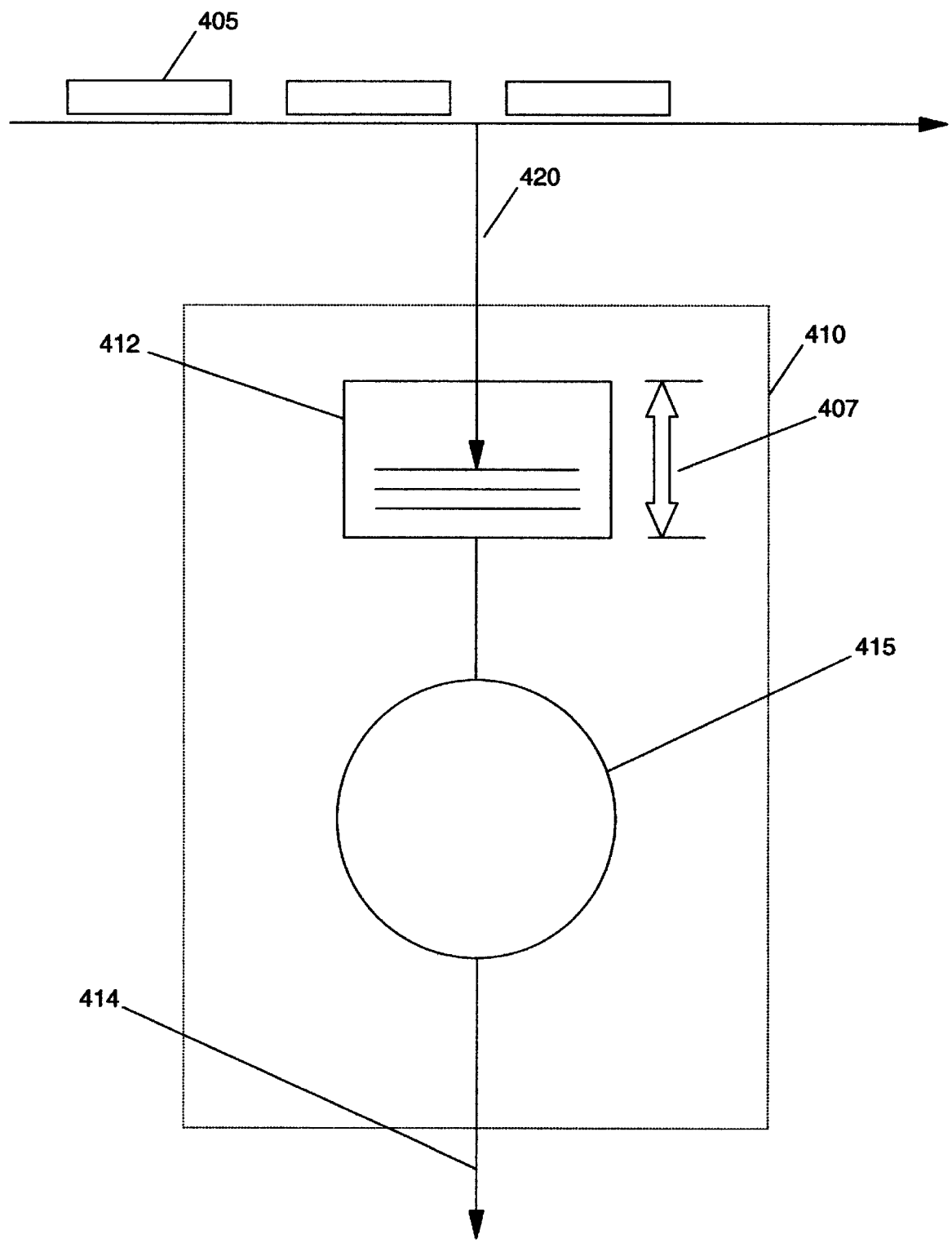
FIG. 4A is a conceptual block diagram of the present invention.

FIG. 4A illustrates a high level block diagram of a particular embodiment of the present invention. The data 405 is transferred from the source node 210 to the destination node 235 using a routing system transport mechanism. In the present embodiment of the invention, a leaky bucket 410 is created at either the first hop in the network, node 215, or the last hop, node 230. The leaky bucket 410 monitors the data 405 transferred over the network from the source node 210 to the destination node 235. The leaky bucket 410 represents the combination of the bucket 412 and the drain rate function 415.

The bucket 412 is used to record the amount of the data 405 transferred over the network. The drain rate function 415 subtracts a portion of the data 420 recorded in the bucket 412 over time. Therefore, the contents of the bucket 412 at some time is represented by an amount of data 420 which has been added to the bucket 412 minus an amount of data 44 which has been drained from the bucket 412 by the drain function 415. Furthermore, when enough of the data 405 has been transported across the network such that the bucket capacity 407 is exceeded and the bucket 412 overflows despite the amount drained from the bucket by drain rate 415, the time is right for a cutover from the routed system transport mechanism to the connection oriented transport mechanism. The bucket capacity 407 of the bucket 412 represents a threshold which must be surpassed in order to justify the cost of switching from one transport mechanism to another. Furthermore, the drain rate function 415 is designed to avoid a cutover in situation where the rate of flow of the data 405 is low.

Figure 4B:
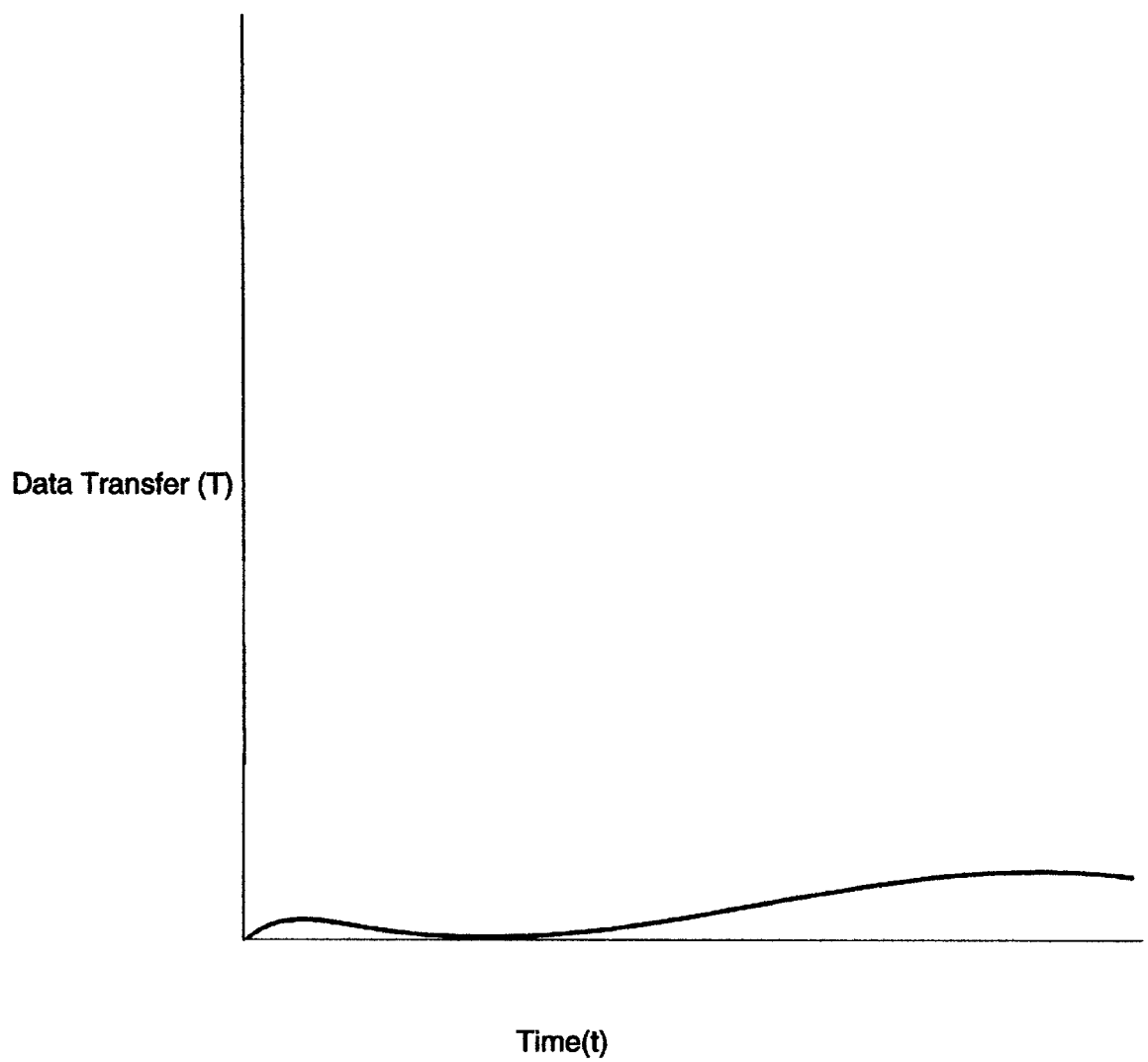
FIG. 4B is a graph showing a possible distribution of data during a transfer across a network.

FIG. 4B illustrates the situation where the amount of data transferred is so low that a connection oriented transport mechanism is not justified. In FIG. 4B the data is transferred over the network over a period of time. Consequently, a connection oriented transport mechanism would not be cost effective. The leaky bucket 412, however, would eventually overflow in a situation represented by FIG. 4B if the bucket 412 were allowed to fill unabated. The drain rate function 415, therefore, is designed to avoid a cutover when the data rate is so low that a significant amount of network bandwidth would be wasted if a connection oriented transport mechanism were used. In other words, the data transfer rate is so low that much of the bandwidth associated with the connection oriented transport mechanism would go unused for much of the time.

Taken together, the bucket 412 and the drain rate function 415 signal a cutover when the data 420 occurs at such a rate and amount that the bucket 412 fills without allowing enough time for data to drain from the bucket 412 through the drain rate function 415. Therefore, in general, a cutover will not occur in situations where the amount of data transferred is low or the time necessary for the data transport to occur is long.

The present embodiment of the invention will now be described in greater detail with respect to the function of the drain rate function 415, the bucket capacity 407 and the signaling of the cutover.

The Bucket Capacity and Drain Rate Function

The bucket capacity 407 may be dependent on the ID contained in the header. Furthermore, the bucket capacity 407 may also be determined by analyzing historical or empirical data concerning data transfers of the type associated with a particular ID. The ID may be used as an index to access the particular bucket capacity 407 for an ID. Those skilled in the art, however, will understand and appreciate that other techniques may be employed to associate the type of data transfer with the bucket capacity 407. The drain rate function 415 is designed to prevent a cutover from occurring in situations where the amount and rate of data 405 does not warrant a cutover. In other words, the drain rate function 415 drains the bucket 412 more quickly at the data transfer progresses over time. Accordingly, the drain rate function 415 must drain the bucket 412 at a rate that varies as a function of time.

To facilitate this operation, a planning horizon is defined ($H_p$). The planning horizon is a prediction of the duration of the data transfer presently being monitored. This can be done by examining the past performance of similar data transfers. In this particular embodiment of the present invention, the similarity is based upon examining an identifier (ID) located in a header associated with the current data transfer. The ID can be used to identify the particular data transfer type. Furthermore, the data transfer type can be used to predict the duration of the data transfer based on historical or empirical data. Those of skill in the art, however, will appreciate that other techniques for identifying similarity between data transfers exist.

In this particular embodiment of the present invention, the planning horizon ($H_p$) is associated with a random variable D (representing the duration of the data transfer) with a probability density function:

$$E = \text{Prob}(D > H_p)$$

where E is the probability that a transfer will take longer than $H_p$. The value of E will determine the accuracy of the cutover decision. In other words, $H_p$ predicts the duration of the data transfer for the unknown future of the flow under consideration (with a probability of (1−E)). $H_p$ is used to vary the drain rate by calculating how much time has elapsed of the predicted duration of the data transfer being monitored. As a result, as time passes and the predicted end of the transfer approaches, the drain rate function 415 increases proportionally. Consequently, as the predicted end of the transfer approaches, a great deal of data transfer would be required to warrant a cutover. Those skilled in the art, however, will understand that other techniques exist for the prediction of the duration of the current data transfer. For example, the prediction could also be based upon empirical data determined during the network's operation. Furthermore, the ID may be used to associate a particular data transfer type with a planning horizon. For example, a lookup table could store the planning horizon for a particular data transfer type using the ID as an index. The ID could then be used to quickly determine the planning horizon for that particular data type. Those skilled in the art, however, will understand and appreciate other well known methods of storing and retrieving the planning horizon based on the ID.

Once the planning horizon has been selected, the leaky bucket drain rate 415 can be determined by using the cost effective cutover value. Therefore, the drain rate function 415 can be expressed as:

$$u(t) = (1/(H_p - t))((S_c - S_r)/(P_r - P_c))$$

Consequently, if the data 405 flows at a rate just below the drain rate 415 for the entire duration of the transfer, a cutover will not occur. In other words, the source node 210 will not have submitted enough traffic to make a cutover to a connection oriented transport system the lower cost choice. If, however, the data 405 flows at a rate consistently higher than the drain rate function 415, the cutover will occur.

Signaling the Cutover

The drain rate function 415 and the bucket 412 are combined to create the leaky bucket 410. The leaky bucket 410 signals a cutover when an overflow occurs. As packet data 420 arrives over the network, it is added to leaky bucket 410. Simultaneously, the drain rate function 415 is used to reduce the content of the bucket 410. The bucket 412, therefore, represents the combination of the accumulated contents of bucket 412 and the net negative effect of the drain rate function 415. The capacity of the bucket 412 is evaluated when the data 420 is detected at the bucket 410. Similarly, the drain rate function 415 is evaluated as of the time that the data 420 arrived at the leaky bucket 410. Specifically, the drain rate function 415 is evaluated over the time interval that has elapsed between the present arrival of the data 420 at the leaky bucket 410 and the arrival of the preceding data 420 at the leaky bucket 410. The amount drained, therefore, can be represented as the integral of the drain rate function over the time interval:

$$\int u(t)dt = (S_c - S_r)/(P_r - P_c)((\ln(H_p - t_{old}) - \ln(H_p - t_{now}))$$

where $t_{old}$ is the time of the last data arrival at the bucket 412 and $t_{now}$ is the present data arrival time. This represents the amount of data 444 which has drained from the bucket 412 through the drain rate 415 in the time elapsed since the data 420 last arrived at the leaky bucket 410. The new content of the bucket, therefore, can be expressed as:

$$\max\{\text{contents}_{old} - \int u(t)dt\} + \text{amount}_{new}$$

In other words, the new content of the bucket can be expressed as the old content of the bucket ($\text{contents}_{old}$) minus the amount of data 444 which has drained out of the bucket 412 by the drain rate function 415 plus the amount of newly arrived data 420 ($\text{amount}_{new}$).

Figure 5:
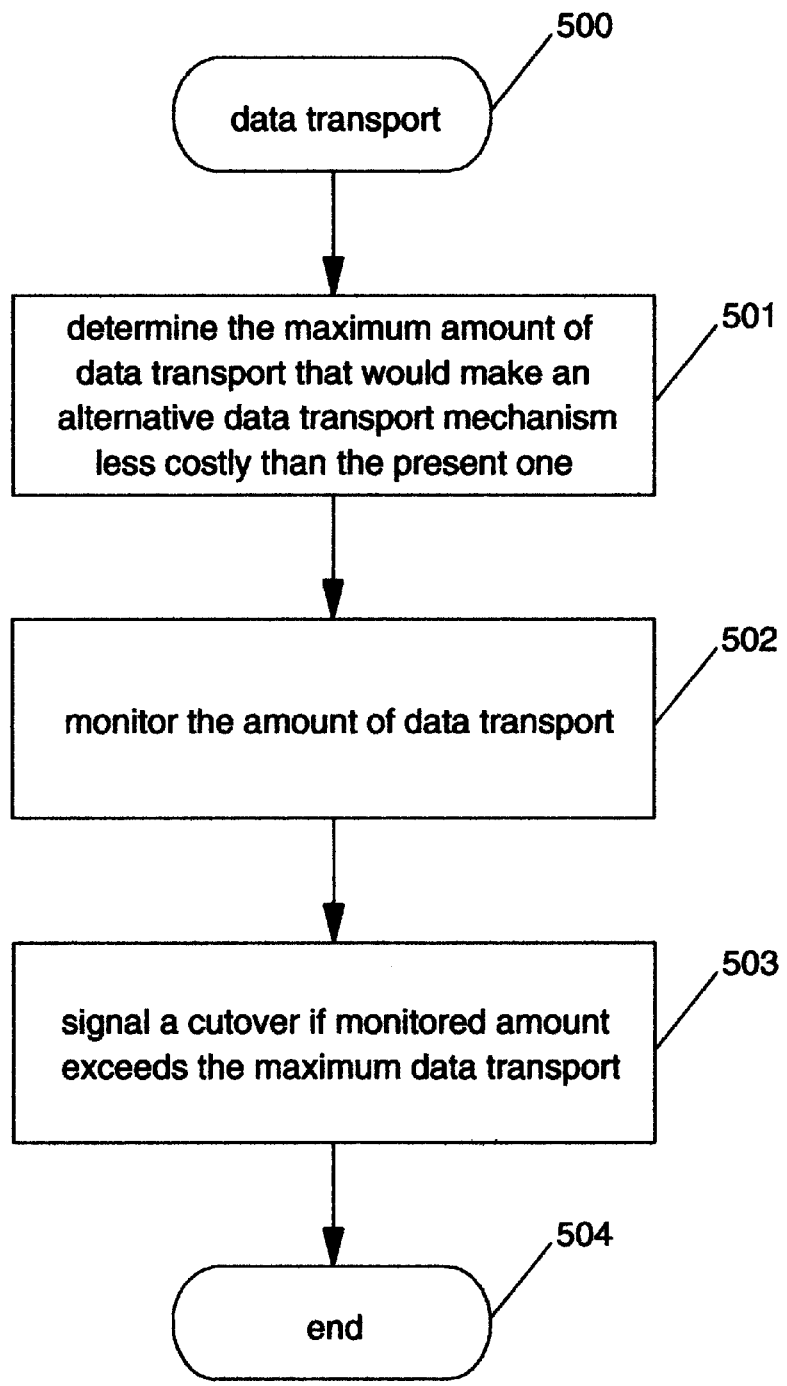
FIG. 5 is a conceptual flow diagram of the operation of the present invention.
Figure 6A:
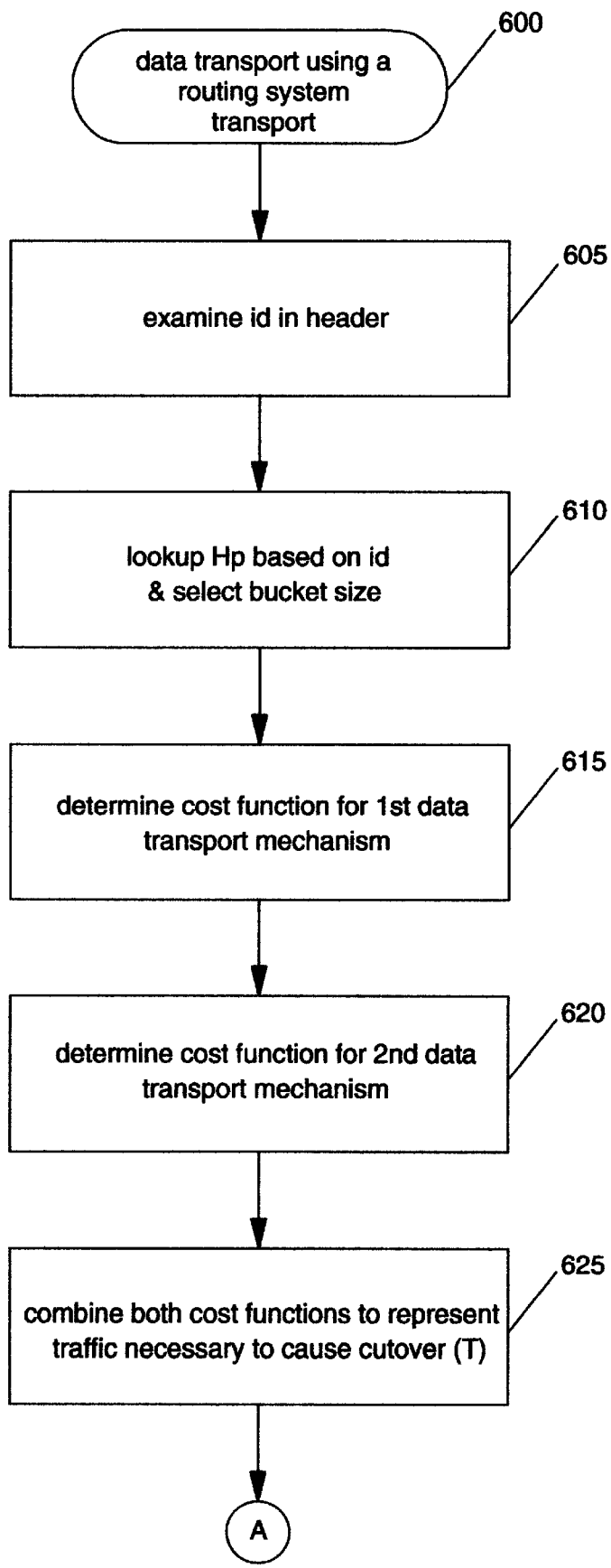
FIGS. 6A and 6B are flow diagrams of a particular embodiment of the present invention.
Figure 6B:
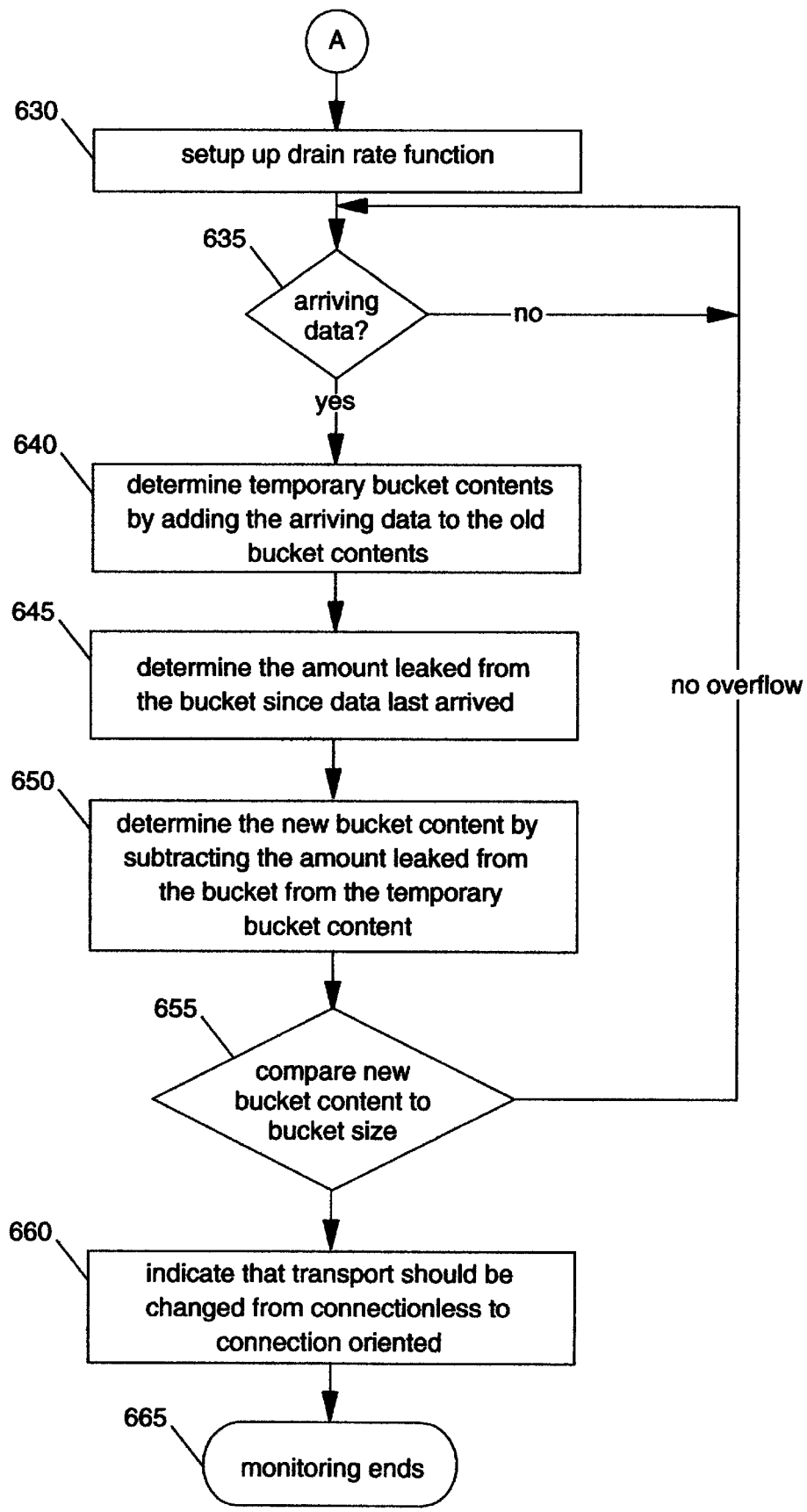

FIGS. 5, 6A and 6B are flowcharts for determining when a data transport should be switched from a routing system transport mechanism to a connection oriented transport mechanism. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks.

These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

FIG. 5 conceptually illustrates switching between a transport mechanism utilizing the present invention. The switching begins with data transport across a network from source node 210 to destination node 235 (Block 500). An analysis is performed on the present data transport mechanism to determine the cost associated with transporting the data across the network using that transport mechanism (Block 501). Similarly, a cost analysis is performed for a connection oriented transport mechanism. Both of the cost analyses are used to determine the amount of traffic which must occur to warrant a cutover from the first data transport mechanism to the connection oriented data transport mechanism. The data transport is then monitored over the life of the connection (Block 502). If over the life of the connection both the amount of data transported and the rate at which is it transported exceeds the amount deemed to warrant a cutover from the routing system to a connection oriented transport mechanism, a cutover will occur (Block 503). The monitoring ends once the lifetime of the data transport ceases.

FIGS. 6A and 6B illustrate the operation of the present invention in a particular embodiment used for switching from a routing system to a connection oriented transport mechanism. Data is transported from a source node 210 to a destination node 235 using a routing system transport mechanism (Block 600). The ID contained within a datagram message is examined (Block 605). Based on the ID found in the datagram message, a planning horizon and bucket size are selected (Block 610). $H_p$ determines the time interval over which the monitoring of the data transport will occur. Next, a cost function for the routing system transport mechanism is determined (Block 615). The cost function is a function of the setup cost of the routing system transport mechanism and the per unit cost of routing messages using the routing system transport mechanism.

Similarly, a cost function for the connection oriented transport mechanism is determined (Block 620). The connection oriented transport cost function is a function of the setup cost associated with the connection oriented transport system and the per unit cost of transporting data using the connection oriented transport mechanism. The cost functions for the routing system transport mechanism and connection oriented transport mechanism are then combined to determine the traffic necessary to cause a cost effective cutover from the routing system transport mechanism to the connection oriented transport mechanism (Block 625). This is done by solving the two cost functions for the traffic variable.

The drain rate function is then set up using the planning horizon $H_p$ and the maximum traffic function (Block 630). The drain rate function is also a function of time such that the drain rate function varies as time progresses. Specifically, the drain rate will increase as time progresses through the planning window $H_p$. For example, at the start of the planning window, the drain rate function is low because not much time has elapsed in the planning window. But as time proceeds, the drain rate function increases such that at a time near the close of the planning window the drain rate function is very large. This has the effect of requiring a data transport to transport large amounts of data near the end of the window to justify a cost effective cutover. Once the necessary functions have been established, the leaky bucket 410 then begins to monitor the data flow.

As data arrives (Block 635), it is monitored by the leaky bucket 410. When data does arrive, the temporary bucket contents are determined by adding the arriving data to the existing bucket contents (Block 640). The amount of data that has leaked from the bucket since the time that data last arrived is then determined (Block 645). This is done by integrating the drain rate function over the time interval for which data has arrived. This yields an amount of the bucket contents which should be drained according to the drain rate function. This amount is then subtracted from the temporary bucket contents to provide the new bucket contents (Block 650). The new bucket contents are then compared to the bucket size C (block 655). If the new contents of the bucket is greater than the bucket size C, an overflow occurs. Otherwise, no overflow has occurred and the leaky bucket 410 continues to monitor data arrival (block 635). Once an overflow is detected, the leaky bucket 410 indicates that transport should be changed from the routing system transport mechanism to the connection oriented transport mechanism (Block 660).

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method for allocating network resources for data transport between a source network node and a destination network node, the method comprising the step of selecting a transport mechanism from a plurality of transport mechanisms based upon a prediction of the cost of the utilization of the transport mechanism so as to provide the transport mechanism having the lowest predicted cost, wherein said step of selecting a transport mechanism comprises the steps of:

monitoring data transport from the source network node to the destination network node utilizing a first transport mechanism to determine a data transfer characteristic of the data transport from the source network node to the destination network node;

determining an amount of data for which the cost of utilizing the second data transport to transport the data over the network is less than utilizing the first data transport to transport the data over the network; and determining whether to switch to the second transport mechanism based upon the predicted cost of utilizing the first transport mechanism and the predicted cost of utilizing the second transport mechanism, wherein said step of determining whether to switch comprises the steps of:

determining a drain rate;

totaling a cost associated with transporting data over a network from a source node to a destination node using the first data transport mechanism;

adjusting the totaled cost associated with transporting data over a network from a source node to a destination node using the first data transport mechanism; and comparing the adjusted total cost to the amount of data for which the cost of utilizing the second data transport to transport the data over the network is less than utilizing the first data transport to transport the data over the network.

2. A method according to claim 1, wherein said determining step comprises the step of:

combining the amount of data for which the cost of utilizing the second data transport to transport the data over the network is less than utilizing the first data transport to transport the data over the network within a planning horizon time.

3. A method according to claim 2, wherein the planning horizon time is determined by examining the nature of the data transport from the source node to the destination node over the network.

4. A method according to claim 3, wherein the nature of the data transport from the source node to the destination node over the network is determine by examining an identifier in a header associated with the data.

5. A method according to claim 2, wherein the planning horizon time represents a time interval.

6. A method according to claim 5, wherein the time interval is selected so as to enable sufficient sampling of the data transport from the source node to the destination node over the network so as to determine whether the data transport should be switched to the second data transport mechanism.

7. A method according to claim 6, wherein the selection is dependent upon historical data associated with the nature of the data transport from the source node to the destination node over the network.

8. A method according to claim 1, wherein said totaling step comprises the steps of:
   detecting the transport of data from the source node to the destination node over the network; and
   increasing a counter in proportion to the amount of data detected.

9. A method according to claim 8, wherein said increasing step comprises the step of increasing the counter by an amount proportional to the number of packets detected.

10. A method according to claim 8, wherein said increasing step comprises the step of increasing the counter by an amount proportional to the number of bytes detected.

11. A method according to claim 8, further comprising the step of recording the time that data arrived.

12. A method according to claim 1, wherein said adjusting step comprises the steps of:
   calculating a portion of cost associated with the data transport using the first data transport mechanism using the drain rate; and
   subtracting the calculated portion of the cost from the total amount.

13. A method according to claim 12, wherein the portion of cost associated with the data transport using the first data transport mechanism is dependent upon the time elapsed since data last arrived.

14. A method for allocating network resources for data transport between a source network node and a destination network node, the method comprising the steps of:
   examining an id in a header associated with a data transport using a first data transport mechanism from a source node to a destination node over a network to determine a planning horizon time interval and a bucket with an associated bucket size;
   determining a cost function associated with using the first data transport mechanism to transport data from the source node to the destination node over the network;
   determining a cost function associated with using the second data transport mechanism to transport data from the source node to the destination node over the network;
   combining the cost function associated with the first data transport mechanism with the cost function associated with the second data transport mechanism so as to create a cutover value representing the cost of data transport necessary to switch from the first data transport mechanism to the second data transport mechanism;
   generating a drain rate function;
   waiting for new data to be transported using the first data transport mechanism;
   adding an amount associated with transporting the new data to the bucket;
   determining the time elapsed between the transport of the new data and the most recent previous data transported using the first data transport mechanism;
   calculating a drained amount using the time elapsed and the drain rate function;
   subtracting the drained amount from the total amount associated with transporting all transported data using the first data transport mechanism so as to obtain an adjusted total amount of all transported data using the first data transporting mechanism; and
   indicating that the data transport should be switched to the second data transport mechanism if the adjusted total amount of all transported data using the first data transporting mechanism exceeds the cutover value.

15. A method according to claim 14, wherein said first data transport mechanism is one of TCP/IP, FTP, HTTP, or GOPHER.

16. A method according to claim 14, wherein said second data transport mechanism is ATM.

17. A method according to claim 14, wherein said cost function associated with using the first data transport is equal to a set up cost of the first data transport mechanism plus a per unit cost of transporting data using the first data transport mechanism multiplied by an amount of data transported from a source node to a destination node over a network.

18. A method according to claim 14, wherein said cost function associated with using the second data transport is equal to a set up cost of the second data transport mechanism plus a per unit cost of transporting data using the second data transport mechanism multiplied by an amount of data transported from a source node to a destination node over a network.

19. A method according to claim 14, wherein said combining step comprises the steps of:
   subtracting the set up cost of the first data transport mechanism from the set up cost of the second data transport mechanism so as to obtain the difference in the set up costs;
   subtracting the per unit cost of the second data transport mechanism from the per unit cost of the first data transport mechanism so as to obtain the difference in the per unit costs; and
   dividing the difference in the set up costs by the difference in the per unit costs so as to obtain the cutover value.

20. A method according to claim 14, wherein said drain rate function is equal to a planning horizon multiplier multiplied by the cutover value.

21. A method according to claim 20, wherein said planning horizon multiplier is equal to 1 divided by the result of subtracting a time value from the planning horizon time interval.

22. A method according to claim 21, wherein said time value represents the time elapsed since the start of the data transport.

23. A method according to claim 14, wherein said calculating step comprises integrating the drain rate function over the time elapsed.

24. A method according to claim 14, wherein said step of predicting the cost of utilizing the first transport mechanism and said step of predicting the cost of utilizing the second transport mechanism predict the costs utilizing an empirical model of the data transfer protocol.

25. A computer program product for allocating network resources for data transport between a source network node and a destination network node, the computer program product comprising:
   a computer readable storage medium having computer-readable program code embodied in said medium, said computer-readable program code comprising:
   computer-readable program code which examines an id in a header associated with a data transport using a first data transport mechanism from a source node to a destination node over a network to determine a planning horizon time interval and a bucket with an associated bucket size;

computer-readable program code which determines a cost function associated with using the first data transport mechanism to transport data from the source node to the destination node over the network;

computer-readable program code which determines a cost function associated with using the second data transport mechanism to transport data from the source node to the destination node over the network;

computer-readable program code which combines the cost function associated with the first data transport mechanism with the cost function associated with the second data transport mechanism so as to create a cutover value representing the cost of data transport necessary to switch from the first data transport mechanism to the second data transport mechanism;

computer-readable program code which generates a drain rate function associated with the bucket;

computer-readable program code means for waiting for new data to be transported using the first data transport mechanism;

computer-readable program code which adds an amount associated with transporting the new data to a bucket;

computer-readable program code which determines the time elapsed between the transport of the new data and the most recent previous data transported using the first data transport mechanism;

computer-readable program code which calculates a drained amount using the time elapsed and the drain rate function;

computer-readable program code which subtracts the drained amount from the total amount associated with transporting all transported data using the first data transport mechanism so as to obtain an adjusted total amount of all transported data using the first data transporting mechanism; and computer-readable program code which indicates that the data transport should be switched to the second data transport mechanism if the adjusted total amount of all transported data using the first data transporting mechanism exceeds the cutover value.

26. A computer program product according to claim 25, wherein said first data transport mechanism is at least one of TCP/IP, FTP, HTTP, and GOPHER.

27. A computer program product according to claim 25 wherein said second data transport mechanism is ATM.

28. A computer program product according to claim 25, wherein said cost function associated with using the first data transport is equal to a set up cost of the first data transport mechanism plus a per unit cost of transporting data using the first data transport mechanism multiplied by an amount of data transported from a source node to a destination node over a network.

29. A computer program product according to claim 25, wherein said cost function associated with using the second data transport is equal to a set up cost of the second data transport mechanism plus a per unit cost of transporting data using the second data transport mechanism multiplied by an amount of data transported from a source node to a destination node over a network.

30. A computer program product according to claim 25, wherein said computer-readable program code which combines comprises:

computer-readable program code which subtracts the set up cost of the first data transport mechanism from the set up cost of the second data transport mechanism so as to obtain the difference in the set up costs;

computer-readable program code which subtracts the per unit cost of the second data transport mechanism from the per unit cost of the first data transport mechanism so as to obtain the difference in the per unit costs; and computer-readable program code which divides the difference in the set up costs by the difference in the per unit costs so as to obtain the cutover value.

* * * * *